United States Patent [19]

Oikawa

[11] Patent Number: 5,638,411
[45] Date of Patent: Jun. 10, 1997

[54] STUFF BIT SYNCHRONIZATION SYSTEM

[75] Inventor: Hiroshi Oikawa, Kamakura, Japan

[73] Assignee: Mitsubishi Denki Kabushiki Kaisha, Tokyo, Japan

[21] Appl. No.: 883,349

[22] Filed: May 15, 1992

[30] Foreign Application Priority Data

May 23, 1991 [JP] Japan ................... 3-118537

[51] Int. Cl.$^6$ ............................................ H04J 3/07
[52] U.S. Cl. ................................. 375/372; 370/505
[58] Field of Search ........................ 375/363, 371, 375/372; 370/48, 102, 112

[56] References Cited

U.S. PATENT DOCUMENTS

| 3,959,588 | 5/1976 | Kelly et al. |  |
|---|---|---|---|
| 4,095,053 | 6/1978 | Duttweider et al. | 370/102 |
| 4,596,026 | 6/1986 | Cease et al. | 375/372 |
| 4,731,646 | 3/1988 | Klien | 348/393 |
| 4,744,082 | 5/1988 | Fujimma et al. | 370/112 |
| 4,750,172 | 6/1988 | Hornung et al. | 370/102 |
| 4,764,941 | 8/1988 | Choi | 375/363 |
| 4,811,340 | 3/1989 | McEachern et al. | 370/102 |
| 5,119,406 | 6/1992 | Kramer | 375/372 |
| 5,132,970 | 7/1992 | Urbansky | 370/102 |
| 5,195,088 | 3/1993 | Urbansky | 370/84 |
| 5,313,502 | 5/1994 | Nawrocki et al. | 375/372 |

FOREIGN PATENT DOCUMENTS

| 0422433 | 9/1990 | European Pat. Off. . |
| 60-70837 | 8/1985 | Japan . |
| 2-207629 | 8/1990 | Japan . |

OTHER PUBLICATIONS

"Easy Digital Transmission", Denki Tsushin Kyokai, pp. 106–110 Apr. 16, 1984.

*Primary Examiner*—Young T. Tse
*Attorney, Agent, or Firm*—Wolf, Greenfield & Sacks, P.C.

[57] ABSTRACT

A stuff bit synchronization system synchronizes high-speed signals utilizing low-speed components. Since the respective components operate at low speeds, the power consumption and calorific value are reduced in the stuffed synchronous system. The stuff bit synchronization system includes a transmitter for transmitting a digital signal. The transmitter includes a buffer for temporarily holding the digital signal to be transmitted and a reading controller that reads contents of the buffer in parallel and provides a stuffing bit. The stuff bit synchronization system also includes a receiver for receiving the digital signal and for removing the stuffing bit from the digital signal.

8 Claims, 11 Drawing Sheets

STUFF BIT SYNCHRONIZATION SYSTEM

FIELD OF THE INVENTION

The present invention relates generally to a digital signal transmission system and, more particularly, to a stuff bit synchronization system.

DESCRIPTION OF THE PRIOR ART

In a stuffed synchronous transmission system, a digital signal is transmitted in accordance with a clock that is independent of the digital signal. The clock is selected to have a frequency slightly higher than the digital signal. Synchronization of the digital signal with the clock is accomplished by adding additional "stuff bits" to the digital signal. A plurality of digital signals may be time-multiplexed by synchronizing the signals with a single clock in order to align the phases of the digital signals with the clock.

FIG. 6 is a functional block diagram of the transmitter section of a stuffed synchronous transmission system as described in Makoto Yamashita, "Easy Digital Transmission", DENKI TUSHIN KYOKAI, Published by OHM Company, 1984. FIG. 7 is a functional block diagram of the receiver section of the system, which is also described in the same publication.

As shown in FIGS. 6 and 7, the stuff bit synchronization system comprises buffer memories 1 and 8, phase comparators 2 and 9, a stuff controller circuit 3, a reading clock generator 4, a clock source 5, a write clock generator 6, a destuff controller 7, a low-pass filter 10 and a voltage controlled oscillator 11.

During operation, a digital input signal "a" is sequentially written into the buffer memory 1 in the transmitter section, in accordance with a write clock signal "b". The write clock signal is synchronized with the input signal "a". The buffer memory 1 may be realized as a conventional data register. The reading clock generator 4 subsequently generates a read clock signal that is derived from a clock signal output by the clock source 5, which may be a crystal oscillator. The read clock signal acts as a read enable signal for the input signal that is stored in the buffer memory 1. The frequency of the read clock signal that is generated by reading clock generator 4 is slightly higher than that of the write clock signal "b". The reading clock generator 4 derives the read clock signal from a clock signal that is generated by clock source 5. The reading clock generator 4 divides the high frequency clock signal into a lower frequency read clock signal. The contents of the buffer memory 1 are serially read out of the buffer memory in the order in which the data was written into the buffer memory. The contents of the buffer memory 1 are serially output over a transmission path leading to the receiver section as the synchronized output signal "c".

Since the frequency of the read clock signal is slightly higher than the write clock signal "b", the contents of the buffer memory 1 would be fully output if the reading operation continued sequentially through the contents of the buffer memory. Eventually, the read clock signal would outpace the write clock signal "b". In order to avoid such an event, the stuff controller 3 controls the phase of the read clock signal that is supplied to the buffer memory 1. The stuff controller 3 may be realized as a gate circuit that decides whether to generate a stop signal based on the output of the phase comparator 2. The stop signal halts the reading operation so that a stuff bit may be inserted.

The phase comparator 2 compares the write clock signal "b" with the read clock signal to determine the phase relationship between the signals. FIG. 8 provides a more detailed depiction of one implementation of the phase comparator 2. In this implementation, the phase comparator 2 is realized as a D-type flip-flop. The D input of the flip-flop is the write clock signal, and the T input of the flip-flop is the read clock signal. A resulting phase difference signal is output as the Q output. This phase difference signal goes to stuff controller 3 as will be described in more detail below.

Based on the result of the comparison performed by the phase comparator 2, the stuff controller 3 adjusts the phase of the read clock signal. The stuff controller 3 adjusts the phase of the read clock signal by inserting a stuff bit in the synchronized output signal "c". In particular, the stuff controller 3 inserts a stuff bit or stuff bits into the synchronized output signal "c" to synchronize the signal with the clock signal generated by clock source 5. This insertion of stuff bits may be viewed as a kind of adjustment of the phase of the read clock signal.

In practice, each frame constituting the output synchronized signal "c" has a predetermined bit position at which a stuff bit may be inserted. Each frame also includes another predetermined position at which a stuff control bit is inserted. The stuff control bit specifies whether or not a stuffing bit is inserted into the frame. Generally, if the stuff control bit is one, a stuff bit is inserted, and if the stuff control bit is zero, a stuff bit is not inserted.

The write clock generator 6 of the receiver section produces a write clock signal from a reception clock signal "e", that is synchronized with the input synchronized signal "d". The input synchronized signal "d" corresponding with the output synchronized signal "c" in FIG. 6.

The destuff controller 7 judges whether or not the input synchronized signal "d" contains a stuff bit, by examining the stuff control bit. Based on the judgment of the destuff controller 7, the write clock generator 6 controls the writing clock signal of the buffer memory 8 such that only data bits are written into the buffer memory 8. Stuff bits and stuff control bits are not written into the buffer memory 8. In other words, the writing clock generator 6 causes the buffer memory 8 to be written with information bits from the synchronized input signal "d" only after any stuff bits and stuff control bits have been removed therefrom.

The bits of the input synchronized signal "d" that are stored in the buffer memory 8 are then read back in the order in which they were written, in accordance with the read clock signal produced from the clock from the voltage controlled oscillator 11. The resulting signal is output as the output signal "f".

The write clock signal produced by the writing clock generator 6 is locally synchronized with the input synchronized signal "d". Since the stuff bit and stuff control bit are removed from the input signal "d", as described above. The write clock signal is synchronized with the input signal "a" which was originally received by the transmitter section.

The phase comparator 9 compares the phase of the write clock signal with the phase of the read clock signal. Based on the result of the comparison, the phase comparator 9 adjusts the oscillation frequency of the voltage controlled oscillator 11. The adjustment is made through a closed-loop circuit having a low-pass filter 10 (e.g., a phase locked loop (PLL) circuit). FIG. 9a provides a more detailed depiction of the low pass filter 10. Input is applied to a leg having a resistor 54 connected to it, and the input is applied to the inverting input of an amplifier 55. The non-inverting input is connected to a resistor 58, which in turn is connected to an earth ground. Resistor 62 and capacitor 64 are connected in a feedback leg running from the output of the amplifier to the inverting input of the amplifier. An additional feedback leg is coupled in parallel with the other feedback leg and includes a resistor 60. The resulting output has a high frequency components removed from it.

An alternative implementation of low pass filters is shown FIG. 9b. This filter 10 is a passive filter rather than the active filter shown in FIG. 9a. The passive filter 10 is formed by resistor 66 that is coupled with a leg having resistor 68 and capacitor 70. The capacitor 70 is also connected to an earth ground. Like the other low pass filter arrangement, this arrangement serves to remove the high frequency components from the input.

As a result of the adjustment that is made to the oscillation frequency of the voltage controlled oscillator 11, the oscillation frequency of the voltage controlled oscillator 11 is averaged by the low-pass filter 10 to produce a clock signal that is synchronized with the input signal "a" in the transmitter section. Thus, the output signal "f" includes the input signal "a" from the transmitter section.

The conventional stuff synchronization systems as shown in FIGS. 6 and 7 are typically coupled to high speed, long distance communication networks, such as long distance telephone networks. These communication networks operate at extremely high speeds, such as 1.6 Mbps or 2.4 Mbps. In contrast, the conventional stuff synchronization systems, like that shown in FIGS. 6 and 7, operates a serial fashion and, as a result, operates slowly relative to the communication network. The slow serial transmissions of stuff bit synchronization systems prevent stuff synchronous systems from optimal performance across the communications network. Furthermore, high speed components have been used in the conventional stuff bit synchronization systems to bring the serial systems up to speeds that are more comparable with the faster combinations network. Such high speed components consume a great deal of power and are expensive.

SUMMARY OF THE INVENTION

It is, therefore, an object of the present invention to provide a stuff bit synchronization system that performs at high speeds without employing expensive components or components that consume great amounts of power.

The foregoing and other objects are realized by a stuff bit synchronization system of the present invention. In accordance with one embodiment, the stuff bit synchronization system comprises a transmitter section for adding a stuff bit to a digital signal and for transmitting a synchronized signal with the clock that is independent of the digital signal. The stuff bit synchronization system also includes a receiver section for receiving the synchronized signal and for reproducing the digital signal contained therein. The transmitter section includes a transmitter side memory for temporarily storing the digital signal. The memory has a plurality of addressable locations. The transmitter section further includes a transmitter-side writing means for sequentially writing the digital signal into the memory means, in accordance with a write clock signal. A transmitter-side reading means is provided for reading the bits of the digital signal in parallel from the transmitter-side memory means in accordance with a read clock signal. Lastly, the transmitter section includes a write control means for comparing the phase of the write signal with the phase of the read signal. A result of this comparison is used to modify an address that is read by the transmitter-side reading means to control whether a stuff bit is inserted into the digital signal.

The receiver section of this embodiment includes a receiver-side memory means for temporarily storing a parallel digital signal that is transmitted by the transmitter section. In addition, the receiver section includes a receiver-side writing means for simultaneously writing information bits of the parallel digital signal, other than stuff bits in the parallel digital signal, into the receiver-side memory means. Still further, the receiver section includes a receiver-side reading means for sequentially reading a written information bits from the receiver-side memory means. Lastly, the receiver section includes a write control means for controlling the receiver-side writing means by distinguishing the information bits in the parallel digital signal from stuff bits. The digital signal that is input to the transmitter section is output for the receiver-side reading means. Preferably both the transmitter-side reading means and the receiver-side writing means comprise a variable frequency divider.

In accordance with another embodiment of the present invention, a stuff bit synchronization system includes a transmitter for transmitting a digital signal. The transmitter includes a buffer for temporarily holding the digital signal and a read controller for controlling the reading of the buffer so that the bits stored in the buffer is read twice to provide a stuff bit that is inserted into the digital signal. The read controller reads the buffer so that the bits of the signal output in parallel are transmitted by the transmitter. The stuff bit synchronization system also includes a transmission path to the digital signal and a receiver for receiving a digital signal and removing the stuff bit from the signal.

DETAILED DESCRIPTION OF A PREFERRED EMBODIMENT

The arrangement and operation of the transmitter section of a stuff bit synchronization system of a preferred embodiment of the present invention will be initially described below, followed by a discussion of the arrangement and operation of the receiver section.

Transmitter Section

Figure 1:
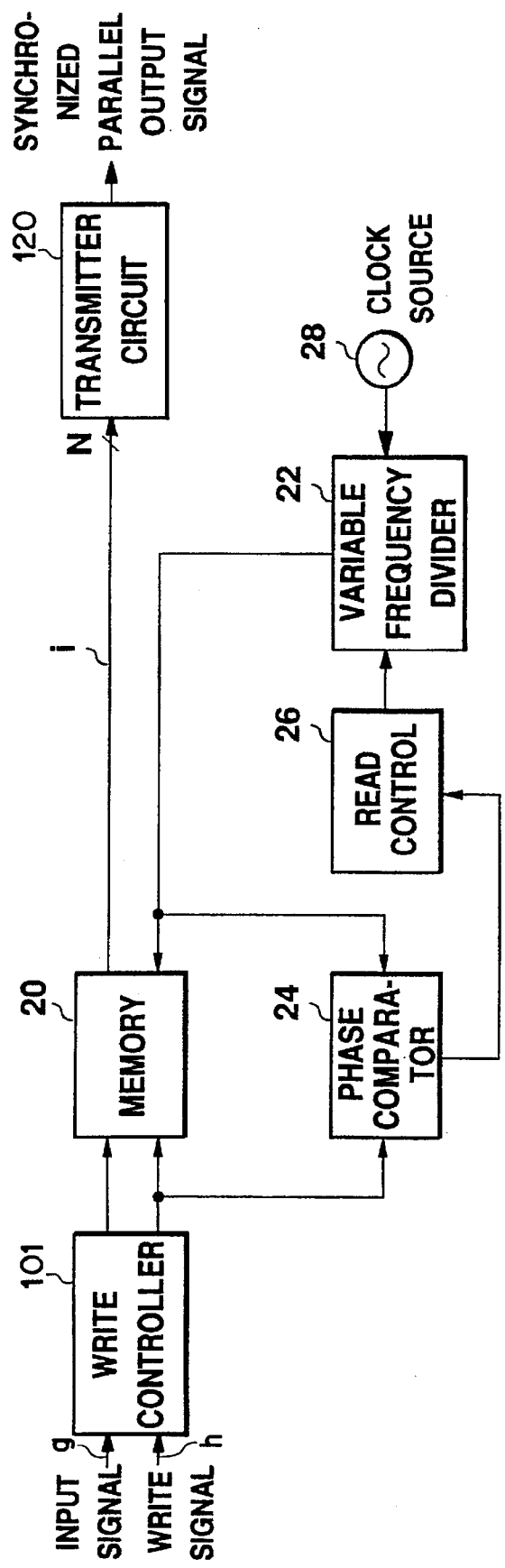
FIG. 1 is a functional block diagram of an embodiment of the transmitter section in a parallel type stuffed synchronous system constructed in accordance with the present invention.
Figure 6:
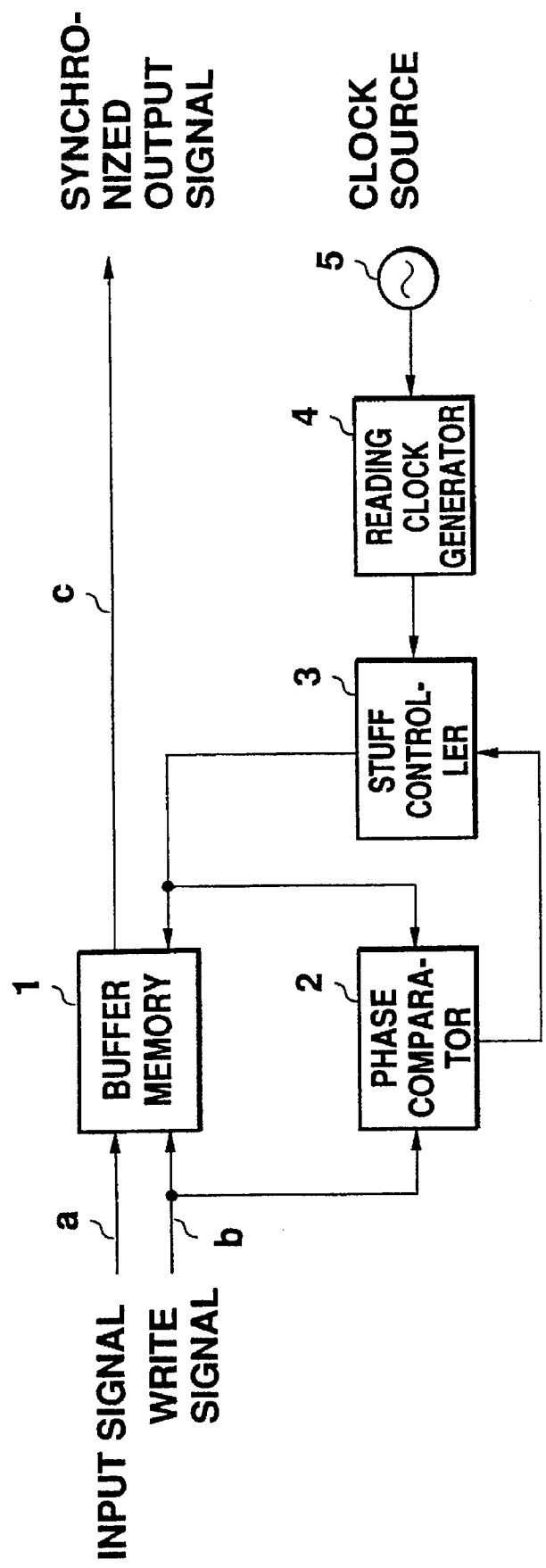
FIG. 6 is a block diagram of the transmitter section in a conventional stuff bit synchronization system.

FIG. 1 shows a transmitter section of a stuff bit synchronization system constructed in accordance with a preferred embodiment of the present invention. In this embodiment, a digital input signal "g" is initially stored in a transmitter-side memory 20, which is a buffer memory having a memory capacity of M bits. The memory 20 may be implemented as a conventional data register. The contents of the transmitter-side memory 20 are subsequently read by a transmitter-side reading means 22. The reading means 22 may be realized as a variable frequency divider. The transmitter section also includes a phase comparator 24 that compares the phase of a write clock signal "h" with the phase of a read clock signal generated by reading means 22. The phase comparator 24 may be like the conventional comparator shown in FIG. 6. Based on the result of the comparison of the phases of the write clock signal and the read clock signal, a read control means 26 modifies the address generated by the transmitter-side reading means 22 so that a stuff bit is inserted into the output synchronized parallel signal "i", which encodes N bits. The reading means 22 generates the read clock signal in synchronization with a clock signal produced by a clock source 28.

The operation of the transmitter section will now be described with reference to FIGS. 2, 3 and 4.

The data of input signal "g" is initially written via a write controller 101, into the buffer memory 20 by the write clock "h", which is synchronized with the input signal "g". Specifically, the writing to the buffer memory 20 is sequentially performed for addresses 0–(M–1) of the buffer memory 20. Once the data is written into the buffer memory 20, the data may be read out and transmitted, through a transmitter circuit 120 (FIG. 1), as the signal "i". The reading of data from the buffer memory 20 also proceeds sequentially. In particular, the variable frequency divider, constituting the transmitter-side reading means 22, uses the clock signal from clock source 28 at the speed of the synchronized parallel signal "i" as an actuating clock for reading out the contents of the buffer memory 20. In the normal state in which no stuff bit is inserted, the variable frequency divider of the reading means 22 generates up to N clock pulses for each clock period. If the insertion of a stuff bit is required, the variable frequency divider of the reading means 22 is controlled by the read control means 26 to sequence through addresses 0–(M–1). In other words, the read control means 26 increments the output "n", which is the output signal of the variable frequency divider, by the number in the range 0–(N–1). The output of the variable frequency divider wraps around to zero when the count exceeds (M–1).

The respective N bits of the synchronized parallel signal "i" will be referred to hereinafter as #1–#N, in the order that the bits are converted into serial signals.

Transmission Without Insertion of a Stuff Bit

Figure 2:
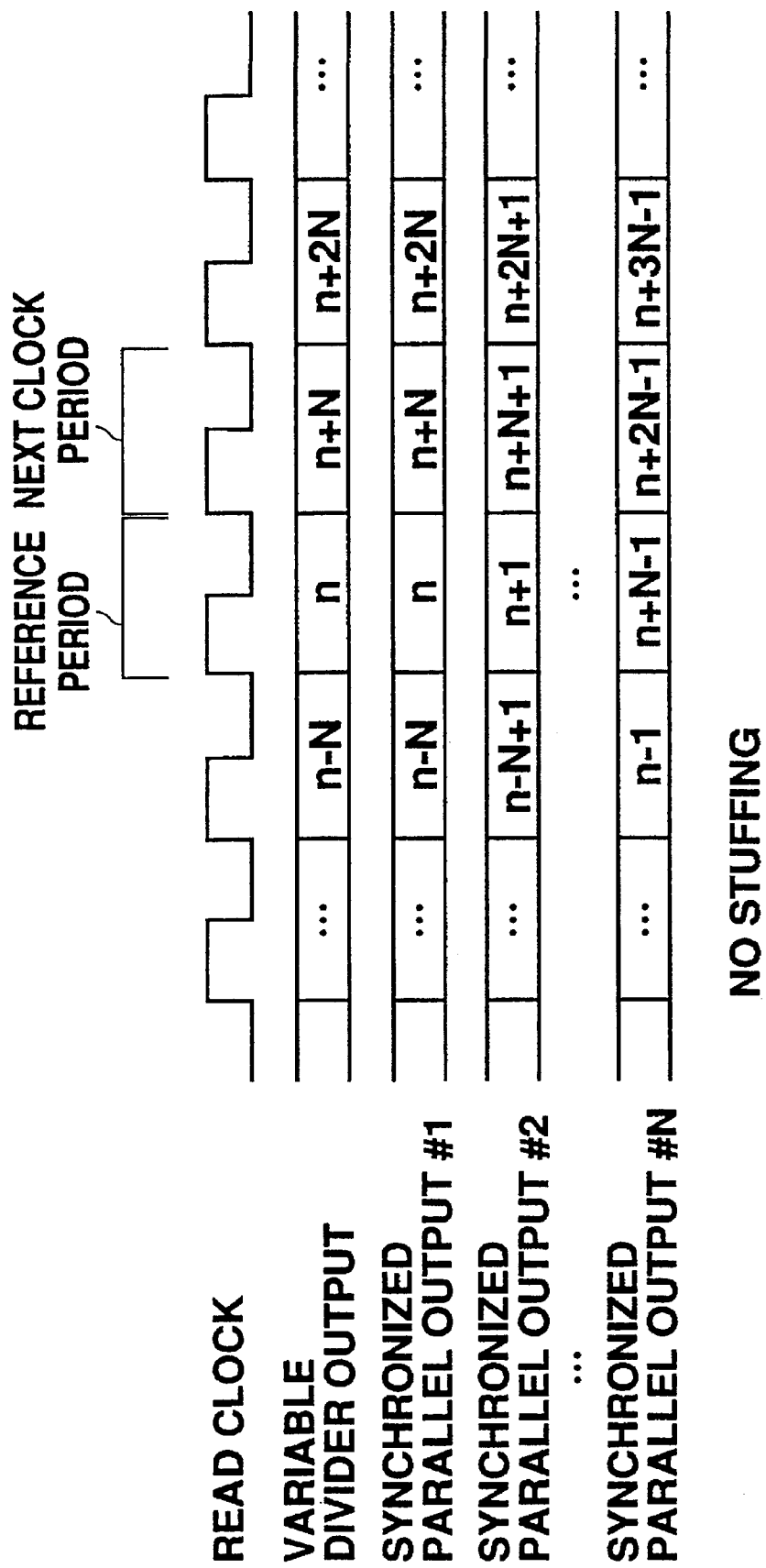
FIG. 2 is a timing chart illustrating operation of the transmitter section of FIG. 1 when no stuffing bit is inserted.

FIG. 2 shows the output timing when no stuff bit is inserted into the signal "i". The output address of the variable frequency divider of the reading means 22 is denoted as n in the reference clock period shown. Thus, the continuous N-bit contents of the buffer memory 20 are read out of the buffer memory from address n to address (n+N–1). The contents of the buffer memory 20 are sequentially output as the synchronized parallel output signal "i", which has parallel elements #1–#N.

In the next clock period, the output address is incremented by N so that the output address of the variable frequency divider is (n+N). The continuous N-bit contents of the buffer memory 20 from address (n+N) to address (n+2N–1) are then read out therefrom. As in the reference clock period, the contents of the memory locations are output as a synchronized parallel signal having N parallel elements #1–#N. The elements are read in the order in which the elements were written into the buffer memory 20.

If the output of the variable frequency divider is n and the value of (n+N) is greater than or equal to M (the memory capacity of the buffer memory), the read address wraps around to zero. In other words, the contents of the buffer memory 20 from address 0 to address (n+N–1–M) are read out in addition to the contents of the buffer memory 20 from address n to address (M–1).

Transmission With Insertion of a Stuff Bit

The phase comparator 24 compares the phase of the write clock "h" with the phase of the read clock signal. If the read clock signal is about to overtake the write clock signal, the address to be read out of the buffer memory 20 is adjusted so as to insert a stuff bit into the synchronized parallel signal "i" of N parallel elements.

Figure 3:
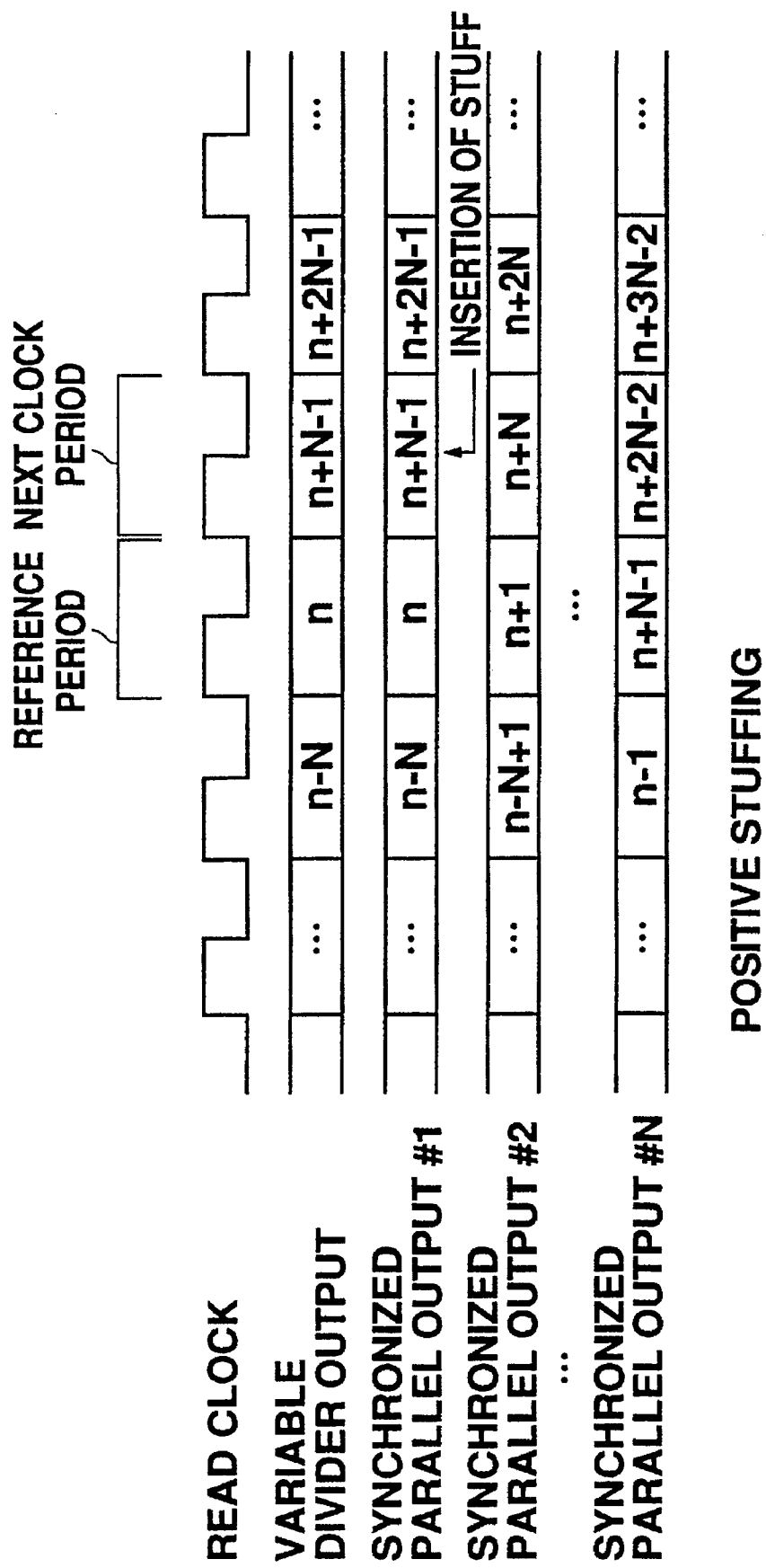
FIG. 3 is a timing chart illustrating operation of the transmitter section of FIG. 1 when a stuffing bit is inserted.

FIG. 3 shows the output timing when a stuff bit is inserted into the synchronized parallel output signal "i". If the output address of the variable frequency divider of the reading means 22 is n, in a reference clock period that is immediately before a period in which a stuff bit is to be inserted, the read control means 26 increments the variable frequency divider output address (n) by N–1 to generate an output address of (n+N–1) in the next clock period. More particularly, in the reference clock period, the continuous N-bit contents of the buffer memory 20 from address n to address (n+N–1) are read. During the next clock period, the continuous N-bit contents of the buffer memory 20 from address (n+N–1) to address (n+2N–2) are read out. The contents thus read out from the buffer memory 20 are output as the synchronized parallel signal "i", having N parallel elements #1–#N.

The first element #1 of the signal that is output in the next clock period, thus, is the content of the buffer memory 20 at address (n+N–1), which is the same as the element #N of the signal that is output during the reference clock period. Hence, the content of the buffer memory 20 at the address (n+N–1) is output twice. The extra bit produced by reading this address twice serves as a stuff bit. By adopting this approach, a stuff bit is inserted while still maintaining the bit order of the input signal "g".

If there is no insertion of a stuff bit in the clock period following the next clock period, the output of the variable frequency divider of the reading means is incremented by N to generate an output address of (n+2N–1). In this next successive clock period, the continuous N-bit contents of the buffer memory 20 from address (n+2N–1) to address (n+3N–2) are read out therefrom. As in the two previous clock periods, the successive N-bit contents of the buffer memory are output as the synchronized parallel signal "i" made from parallel outputs #1+#N.

Transmission With Negative Stuffing

Figure 4:
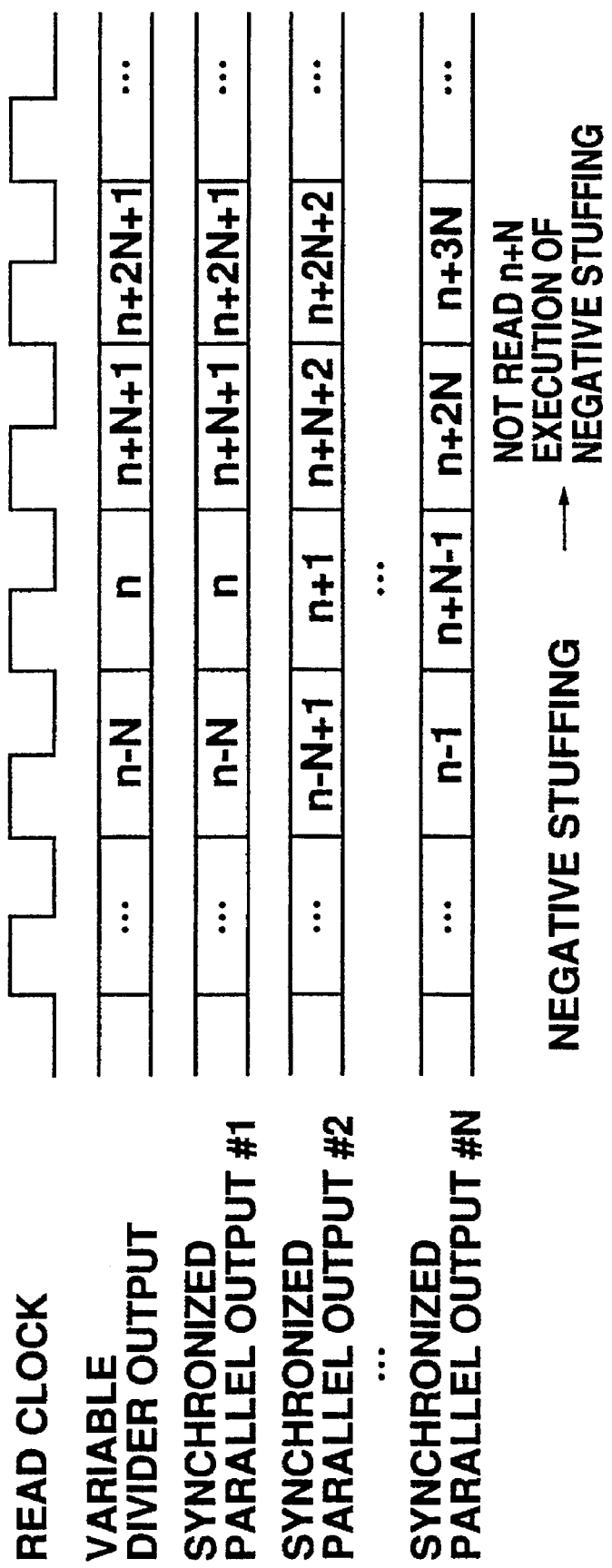
FIG. 4 is a timing chart illustrating operation of the transmitter section of FIG. 1 when a bit is removed.

The operation of the stuff bit synchronization system when negative stuffing is carried out is shown in FIG. 4. If the speed of the input signal "g" is greater than that of the read clock signal, at least one bit in the input signal "g" is cancelled in the following manner. First, the phase comparator 24 compares the phase of write clock signal "h" with the phase of the read clock signal. If it is judged that the phase relationship between these clock signals has deteriorated so that the write clock signal is outpacing the read clock signal, the reading from the memory is controlled to cancel at least one bit in the input signal "g". For example, if one input signal bit is cancelled, the increment of the variable divider is set at (N+1) by the read control means 26. Given that the output of the variable divider is currently n, the output of the variable divider becomes (n+N+1). The N bits from address (n+N+1) to address (n+2N) are the read from the buffer memory 20 and output as bits #1 to #N in the synchronized parallel signal of N parallel. In other words, the contents at address n+N of the memory are not read. Thus, one bit is cancelled while the other bits in the input signal "g" are maintained. When negative stuffing is no longer desired immediately after negative stuffing is carried out, the output of the variable divider is incremented by N to (n+2N+1). The continuous memory contents of N bits from (n+2N+1) to (n+3N) are then read from the memory and similarly output as the synchronized parallel signal of N parallel bits.

Receiver Section

Figure 5:
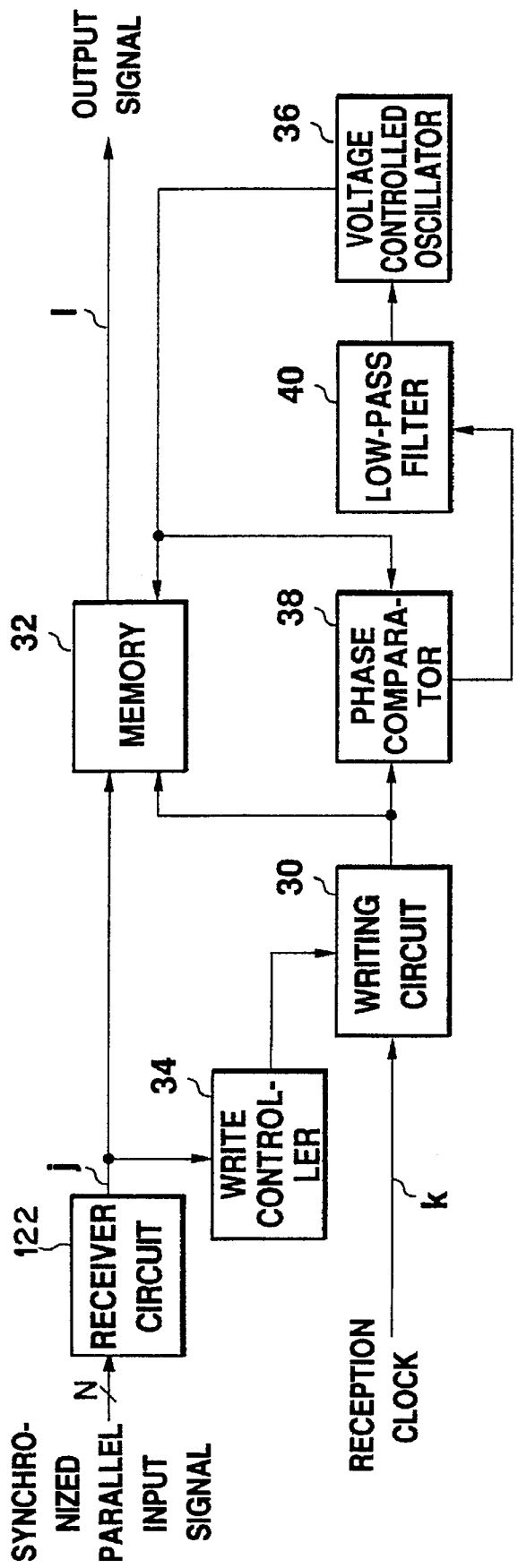
FIG. 5 is a block diagram of an embodiment of the receiver section in a stuff bit synchronization system constructed in accordance with the present invention.

The arrangement and operation of the receiver section will now be described. FIG. 5 is a functional block diagram of one embodiment of a receiver section in the stuffed synchronous system of an embodiment of the present invention. It is assumed herein that there are N bits in the synchronized parallel input signal "j", as there are in the signal "i" that is output by the transmitter section. The receiver-side memory means has a memory capacity of L.

Figure 7:
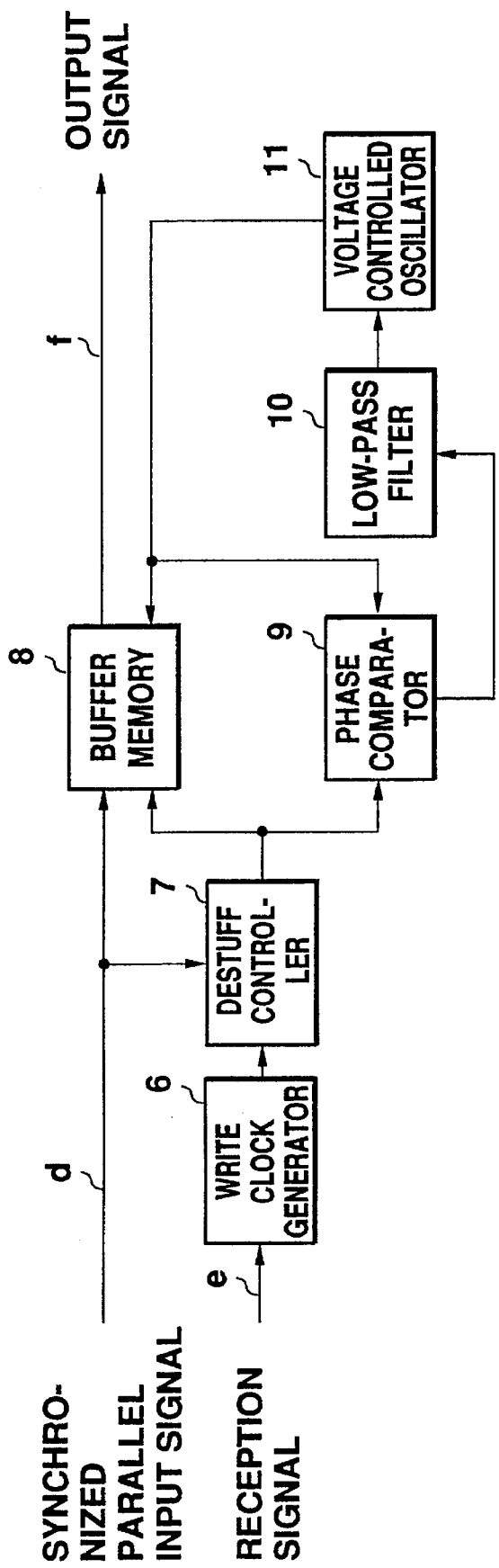
FIG. 7 is a block diagram of the receiver section in a conventional stuff bit synchronization system.
Figure 8:
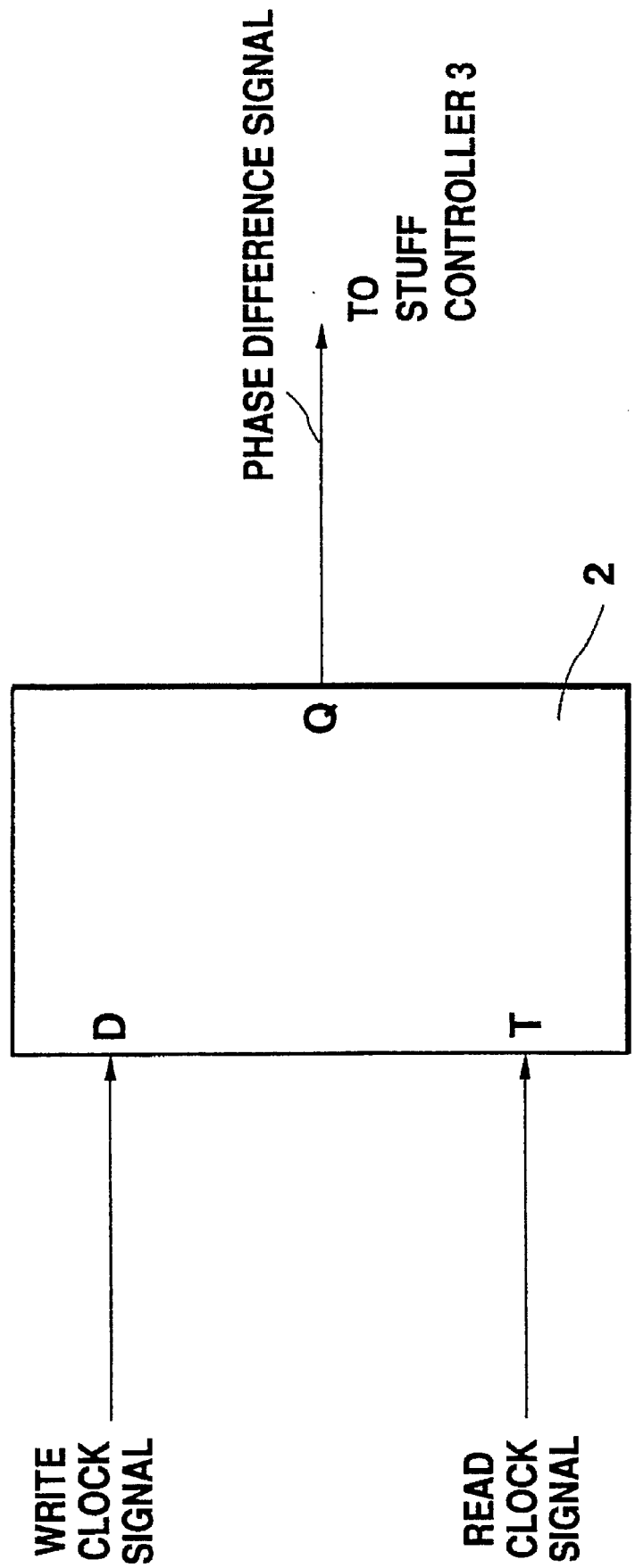
FIG. 8 is a depiction of an implementation of the phase comparator 2 of FIG. 6.
Figure 9A:
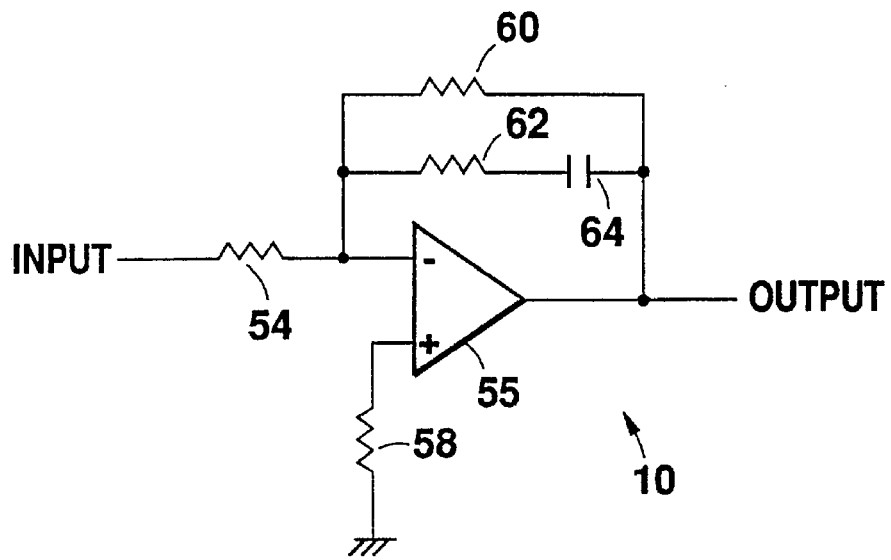
FIG. 9a is a schematic diagram of an active implementation of the low pass filter of FIG. 7.
Figure 9B:
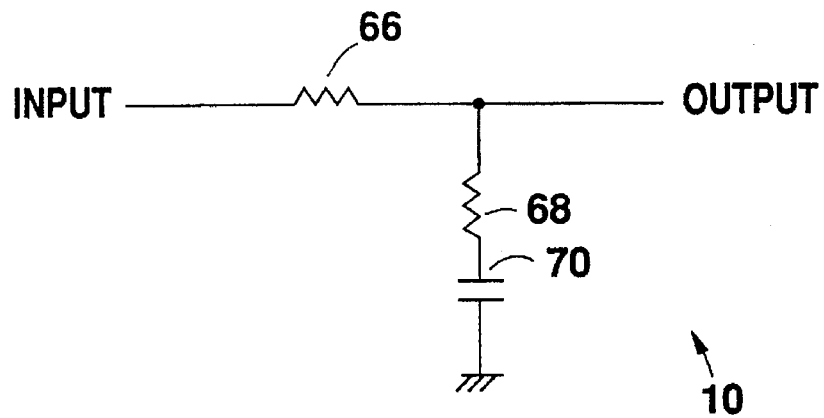
FIG. 9b is a schematic diagram of a passive implementation of the low pass filter of FIG. 7.

The synchronized parallel signal "j" is received by a receiver circuit 122 in the receiver section and is written into a memory 32 by a receiver-side writing circuit 30 (which is a variable frequency divider). The memory 32 is a buffer memory having a memory capacity of L bits. The timing for writing to the memory 32 is controlled by a reception clock signal "k". The write controller 34 selects bits to be written from the synchronized parallel signal "j". Further, the phase comparator 38 compares the phase of a write clock signal generated by the receiver-side writing circuit 30 with the phase of a receiver-side read clock signal produced by the voltage controlled oscillator 36. The phase comparator 38 may be like the conventional comparator 9 shown in FIG. 7. The phase difference obtained from this comparison is then passed to the voltage controlled oscillator 36 through the low-pass filter 40 to control the output frequency of the output from the voltage controlled oscillator 36. The low-pass filter 40 and voltage controlled oscillator 36 may be realized using conventional components like the low-pass filter 10 and voltage controlled oscillator 11 that are shown in FIG. 7.

Reception Without a Stuff Bit

During operation, the receiver side writes and then reads addresses 0–(L−1) sequentially in the buffer memory 32. The variable frequency divider, constituting the receiver-side writing circuit 30, uses the reception clock signal "k" at the speed of the synchronized parallel signal "j" as an actuating clock. In the normal state in which no stuffing bit is inserted, the variable frequency divider increments its output address by N bits each clock period. Since the output of this variable frequency divider is used as an address in the buffer memory 32, the resulting output is from addresses 0 to (L−1). If the output of the variable frequency divider exceeds the maximum value of (L−1), the output address wraps around to zero.

The respective bits of the synchronized parallel signal "j" will be referred to hereinafter as #1–#N in the order that the bits have been converted into serial signals, as in the transmitter section.

If the parallel synchronized signal "j" received by the receiver section in a clock period does not contain a stuff bit and the output of the variable frequency divider in the receiver-side writing circuit 30 is n, the receiver-side writing circuit 30 writes the synchronized parallel signal "j" having elements #1 to #N, into the buffer memory 32 at successive regions specified by addresses n through (n+N−1). In the subsequent clock period, the output of the variable frequency divider is incremented by N to generate an output of (n+N). The information of the synchronized parallel signal "j" as bits #1 to #4 are written into the buffer memory 32 at successive regions indicated by the addresses (n+N) to (n+2N−1).

The write address wraps around to zero if the output of the variable frequency divider is n and if (n+N) is greater than or equal to L. In other words, the writing is performed for the buffer memory 32 at the memory address from 0 to (n+N−1−L) and writing is performed, in addition, from address n to address (L−1).

Reception With a Stuff Bit

In accordance with a stuff control bit in the synchronized parallel signal "j", the write controller 34 judges whether or not a stuff bit is contained in the "j" signal. If the result of this judgment indicates that the signal "j" contains a stuff bit, the receiver-side writing circuit 30 is controlled to cancel the stuff bit. In a clock period wherein a stuff bit is received in the receiving side, the write control means 34 causes the variable frequency divider to be incremented by (N−1) so that the output address is (n+N−1), where n is the previous output of the divider in the immediately preceding chock period.

The resulting (N−1)-bit signal that is obtained by the removal of the stuff bit from the synchronized parallel signal "j" is written into the buffer memory 32 at successive (N−1)-bit memory areas specified by addresses (n+N) to (n+2N−2). No bit is written to the buffer memory 32 at the address (n+N−1), as a signal written there in the immediately preceding clock period does not contain a stuff bit.

In the subsequent clock period wherein no stuffing bit is received by the receiving side, the variable frequency divider is incremented by N to generate an output address of (n+2N−1). The respective bits defining the synchronized parallel signal "j" are written into the buffer memory 32 at successive N-bit memory regions specified by addresses (n+2N−1) to (n+3N−2).

Reception with Negative Stuffing

In the case where negative stuffing is used, the write controller 34 judges whether there is any negative stuff from the stuff control bit in the synchronized parallel signal "j". If the controller 34 judges that negative stuffing has been used, the controller controls the writing to the buffer memory 32 so that any cancelled bits are re-inserted.

If the output of the variable divider is n, the variable divider is incremented by (N+1) in number by the write controller 34 so that its output is (n+N+1). Thus, the synchronized parallel signal "j" is written in the memory at a continuous memory region of N bits from the address (n+N+1) to address (n+2N). The address (n+N) not written to but stores any previously written signal. Hence, the signal cancelled in the transmitter section is re-inserted in the receiver section.

If the signal received during the next clock period has no negative stuffing, the output of the variable divider is incremented by N to (n+2N+1). As a result, the synchronized parallel signal "j" is written in the buffer memory 32 at its continuous memory region of N bits from address (n+2N+1) to address (n+3N).

The synchronized parallel signal "j" is written into the buffer memory 32. Thus the bit order in the synchronized parallel signal "j" is maintained to reproduce the input signal "g" of the transmitter section in the buffer memory 32.

The bits of the written synchronized parallel signal "j" are sequentially read our from the buffer memory 32 to form an output signal "l" in accordance with a read clock signal from the voltage controlled oscillator 36. The phase comparator 38 compares the phase of the write clock signal with the phase of the read clock signal of the buffer memory 32. Based on the result of this comparison, the oscillation frequency of the voltage controlled oscillator 36 is controlled by a closed-loop circuit using the low-pass filter 40 to reproduce a clock signal that is averaged in frequency. The averaged frequency is synchronized with the input signal "g" that is input into the transmitter section. Thus, the output signal "l" contains the input signal "g" to the transmitter section.

Although the present invention has been described with reference to an example where the synchronized parallel signal of N parallel elements contain one stuff bit in one clock period, it is possible for the present invention to be applied where a plurality of stuff bits are used.

It is, therefore, understood that the present invention may be applied to the case where the positive and negative stuff operations are established in the same frame.

Figure 10:
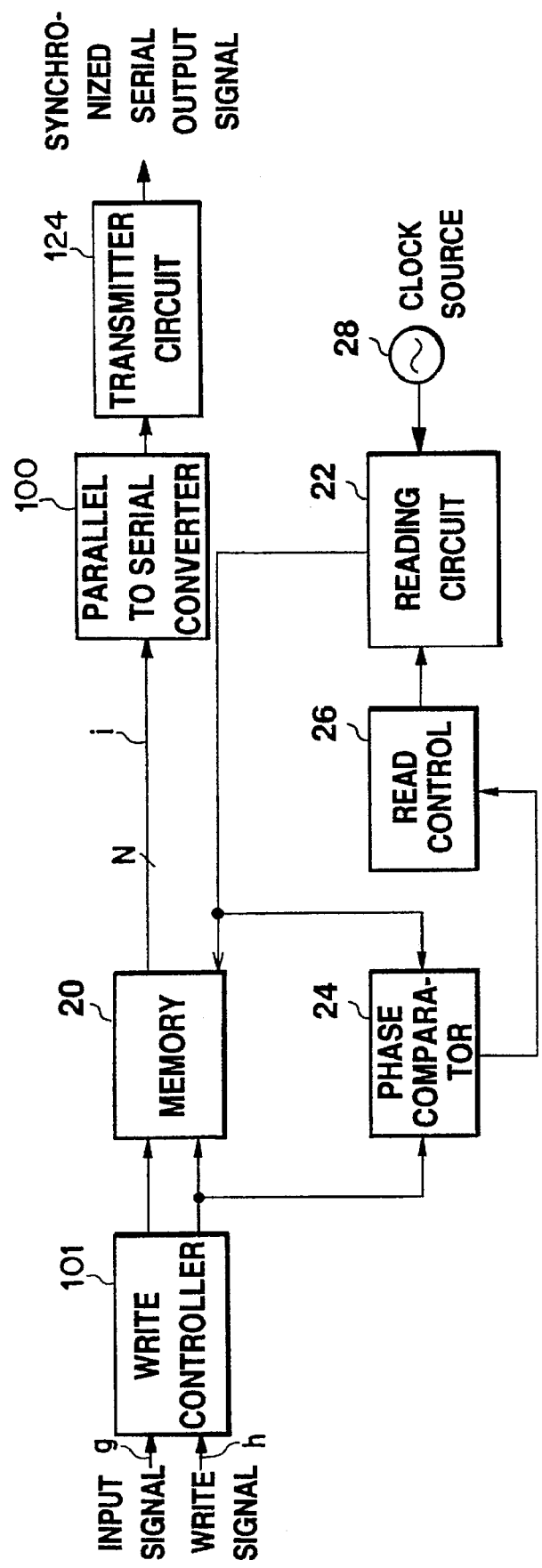
FIG. 10 is a block diagram of an embodiment of the transmitter section of the present invention including a parallel to serial converter.
Figure 11:
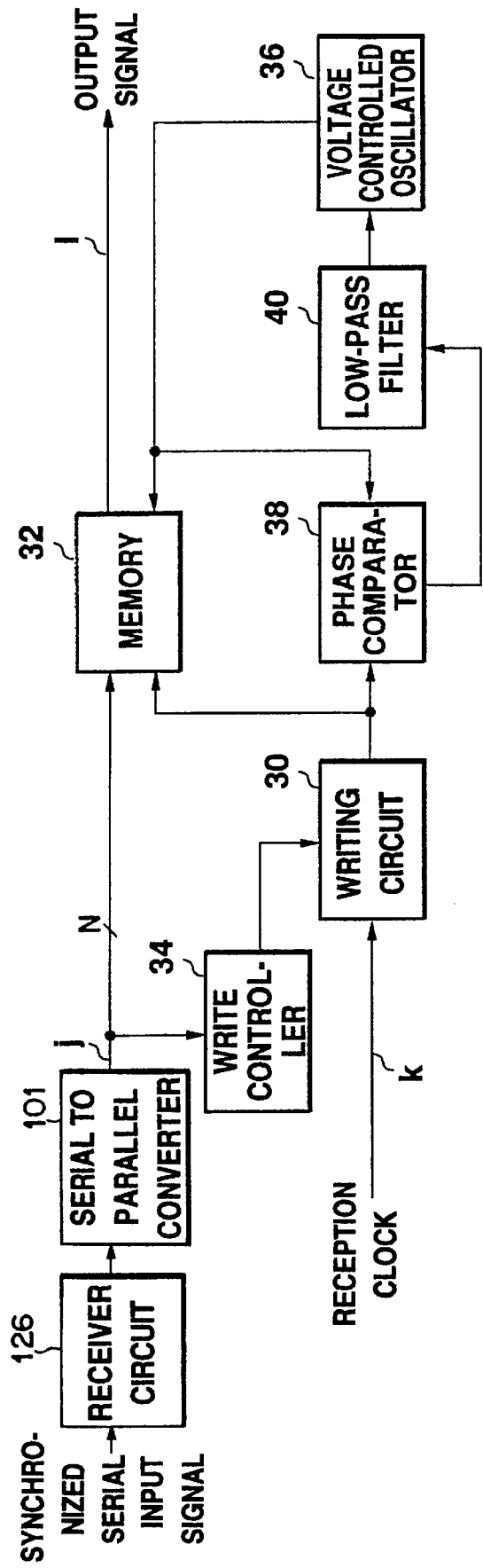
FIG. 11 is a block diagram of an embodiment of the receiver section of the present invention including a serial to parallel converter.

In an alternate embodiment of the present invention shown in FIGS. 10–11, the transmitter section includes a parallel to serial converter 100, coupled between the memory 20 and a transmitter circuit 124, which converts the output signal 'T' into a serial data stream, and the receiver section includes a serial to parallel converter 102, coupled between a receiver circuit 126 and the memory 32, that converts the serial data stream back into a parallel signal "j". In this manner, the signals output from the transmitter section are bit multiplexed in the order of time series so that the stuffed synchronous system of the present invention can obtain the same output serial signal as is obtained by prior art stuffed synchronous systems.

Even if the stuffed synchronous system of the present invention is applied to the synchronization of high-speed signals having their speeds equal to or higher than several tens Mbit/s, it is realized economically, since the system may be made from low-speed components.

While the present invention has been shown with reference to a preferred embodiment, those skilled in the art know of various changes in form and function that may be made without departing from the spirit and scope of the invention as defined in the appended claims.

I claim:

1. A stuff bit synchronization system, comprising a transmitter section for adding a stuff bit to a digital signal and for transmitting a synchronized signal produced by synchronizing said digital signal with a clock independently of said digital signal and a receiver section for receiving said synchronized signal and for reproducing said digital signal therein, a) said transmitter section comprising:
   i) transmitter-side memory means for temporarily storing said digital signal, said memory means having a plurality of addressable locations;
   ii) transmitter-side writing means for sequentially writing said digital signal into said transmitter-side memory means in accordance with a write clock signal;
   iii) comparison means for comparing the phase of the write clock signal with the phase of a read clock signal to determine whether the stuff bit should be inserted into the digital signal;
   iv) transmitter-side reading means, coupled to the transmitter side memory means and the comparison means, for reading bits of the digital signal in parallel from said transmitter-side memory means to generate a parallel digital signal output from the transmitter-side memory means, the transmitter side reading means including;
      address means for selecting an address of a location in the transmitter-side memory means to be read at each cycle of the read clock signal, and
      control means, coupled to the comparison means and the address means, for receiving an indication that the stuff bit should be inserted into the digital signal and for controlling the address means to read an address twice to insert the stuff bit into the digital signal;
   v) transmitter output means, responsive to the transmitter-side memory means, for transmitting an output signal to the receiver section that is representative of the parallel digital signal;
b) said receiver section comprising:
   i) receiver input means for receiving the transmitter output signal and for generating a received parallel digital signal;
   ii) a receiver-side memory coupled to the receiver input means;
   iii) receiver-side writing means for simultaneously writing information bits of said received parallel digital signal, other than the stuff bit in said received parallel digital signal, into said receiver-side memory to form a set of written information bits;
   iv) receiver-side reading means for sequentially reading said set of written information bits from said receiver-side memory; and
   v) write control means for controlling said receiver-side writing means by distinguishing the information bits in the received parallel digital signal to be written from the stuff bit, whereby the digital signal input into the transmitter section is output from said receiver section.

2. The stuff bit synchronization system as defined in claim 1 wherein said transmitter-side reading means comprises a variable frequency divider.

3. The stuff bit synchronization system as defined in claim 1 wherein said receiver-side writing means comprises a variable frequency divider.

4. The stuff bit synchronization system as defined in claim 1 wherein said transmitter section further includes a parallel to serial conversion means, coupled between the transmitter-side memory means and the transmitter output means, for converting the parallel digital signal into a serial signal so that the transmitter output means outputs a serial transmitter output signal and wherein said receiver input means includes a serial to parallel conversion means for converting said serial transmitter output signal into said received parallel digital signal.

5. A stuff bit synchronization system, comprising:
a) a transmitter for transmitting a digital signal, said transmitter comprising:
   I) a buffer for temporarily storing the digital signal to be transmitted;
   II) address means, coupled to a read clock source and the buffer, for selecting an address of a location in the buffer to be read at each cycle of a read clock signal; and
   III) a read controller, coupled to the address means, for controlling the address means so that the stored digital signal is read from the buffer in parallel, and so that a bit stored in the buffer is read twice to provide a stuff bit that is inserted into the digital signal read from the buffer to provide a stuffed digital signal transmitted by the transmitter;

b) a transmission path for the stuffed digital signal; and c) a receiver for receiving the stuffed digital signal and removing the stuff bit from the stuffed digital signal.

6. The stuff bit synchronization system as recited in claim 5 wherein the address means comprises a variable frequency divider.

7. In a stuff bit synchronization system, having a transmitter and a receiver, the transmitter including a buffer for storing a serial input digital signal, a method, comprising the steps of:

a) serially storing the serial input digital signal in the buffer;

b) reading bits of the digital signal in parallel from the buffer to form a parallel digital signal;

c) generating a stuffing bit for the parallel digital signal by reading at least one bit in the buffer twice;

d) inserting the stuffing bit into the parallel digital signal to form a stuffed digital signal;

e) transmitting the stuffed digital signal in parallel to the receiver.

8. The method as recited in claim 7, further comprising the receiver performing the steps of:

f) regenerating the parallel digital signal by removing the stuffing bit from the stuffed digital signal;

g) converting the regenerated parallel digital signal into a serial digital signal representative of the input digital signal.

* * * * *